United States Patent
Genth et al.

[11] 4,228,065
[45] Oct. 14, 1980

[54] MICROBIOCIDAL ORGANOPOLYSILOXANE MOLDING COMPOSITIONS

[75] Inventors: Hermann Genth; Wilfried Paulus; Paul Schiller, all of Krefeld; Hans Sattlegger, Odenthal; Karl Schnurrbusch, Leverkusen, all of Fed. Rep. of Germany

[73] Assignee: Bayer Aktiengesellschaft, Leverkusen, Fed. Rep. of Germany

[21] Appl. No.: 931,045

[22] Filed: Aug. 4, 1978

[30] Foreign Application Priority Data

Aug. 19, 1977 [DE] Fed. Rep. of Germany ........ 2737405

[51] Int. Cl.² .............................................. C08K 5/34
[52] U.S. Cl. ............................ 260/45.8 N; 106/18.32; 106/18.33; 260/37 SB; 528/901
[58] Field of Search .............. 260/45.8 NH, 45.8 NB; 528/901; 548/306; 106/18.32, 18.33

[56] References Cited

U.S. PATENT DOCUMENTS

| | | | |
|---|---|---|---|
| 2,902,467 | 9/1959 | Chipman | 528/901 |
| 3,532,726 | 10/1970 | Viventi | 528/901 |
| 3,562,290 | 2/1971 | Fawzi | 548/306 |
| 3,580,939 | 5/1971 | Ceyzeriat et al. | 528/901 |
| 4,008,351 | 2/1977 | Inoue et al. | 260/45.8 NB |

Primary Examiner—Hosea E. Taylor
Assistant Examiner—R. A. White
Attorney, Agent, or Firm—Sprung, Felfe, Horn, Lynch & Kramer

[57] ABSTRACT

An organopolysiloxane composition having a microbiocidal action comprising an α,ω-dihydroxypolydiorganosiloxane and a benzimidazolyl-alkyl-carbamate of the formula

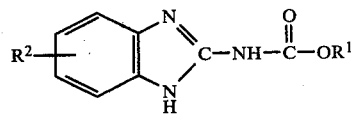

wherein
$R^1$ is an alkyl radical with 1 to 4 carbon atoms, optionally substituted by the radical $-OR^3$,
$R^3$ is an alkyl radical with 1 to 4 carbon atoms or the phenyl radical, and
$R^2$ is hydrogen, an alkyl radical with 1 to 4 carbon atoms, haolgen or nitro.

Advantageously the carbamate is methylbenzimidazolylmethyl-carbamate, N-(fluorodichloromethylthio)-phthalimide, is present as a synergistic fungicide and the composition further comprises a silicon-containing crosslinking agent for the siloxane, a heavy metal salt or amino accellerant for crosslinking and an α,ω-bis-(trimethylsiloxy)-polydimethylsiloxane. Water per se or in atmospheric air cures the composition to a rubber elastic product resistant to microbes.

9 Claims, No Drawings

MICROBIOCIDAL ORGANOPOLYSILOXANE MOLDING COMPOSITIONS

The invention relates to mixtures of organopolysiloxanes with specific crosslinking agents, which are plastically moldable and are provided with a microbicidal, and especially fungicidal, ingredient and which are converted in the presence of water or water vapor to a rubbery-elastic state.

Such mixtures are used mainly as gap-filling putty and sealing compositions in the building trade, in sanitary installation and in the construction of aquaria. They all contain, as the base constituent, an α,ω-dihydroxypolydiorganosiloxane which is optionally mixed with a filler or other additives, such as pigments. If this is mixed with a silicon compound which contains at least three groups which are able to react both with silanol groups and with water and if the admittance of moisture is excluded, mixtures result which are stable on storage and which, on the admittance of atmospheric air, react, due to the water vapor content of the air, to give an elastomeric crosslinked product (compare, for example, W. Noll, Chemie u. Technologie der Silicone (Chemistry and Technology of Silicones), Verlag Chemie, Weinheim 1968, page 341 et seq.).

Water-reactive silicon compounds having a crosslinking action of this type which are known and commonly used are, for example, alkoxy-, amino-, oximato-, acyloxy- or acylamido-silanes. The multiplicity of these crosslinking agents offers the welcome possibility of adaptation to the particular technical requirements, with regard to processing, adhesion to the given substrate and mechanical properties.

The rate and the course of these reactions are, if necessary, influenced by additions of catalysts or other substances. Sometimes substances to improve the adhesion of the crosslinked organopolysiloxane elastomer to different substrates are also added to these compositions.

The abovementioned substances are now mixed in diverse devices to give a paste containing polymer, fillers, plasticizer and additives, which is stable on storage in the absence of moisture and is converted to an elastomer only on the admittance of moisture.

A common feature of all of these rubbery-elastic products is that, particularly when they are used in the sanitary field, they are frequently attacked by fungi and other micro-organisms. Unpleasant accompanying phenomena of this type manifest themselves, for example, as fungal attack on rubber seals on baths, showers, toilets and washbasins. These are discolored and become stained and of unpleasant appearance.

For a long time now attempts have been made to eliminate this phenomenom by mixing into the paste further additives which have a known microbicidal action. However, these substances are mostly very complicated compounds, which, in the abovementioned mixture, may not change during storage and under transport conditions, sometimes up to 50° C., and which is even more difficult, may not adversely influence the crosslinking mechanism and the properties (color, adhesion, degree of crosslinking) of the paste and of the crosslinked product. Amongst the currently available fungicides it was not possible to find one which can be employed without trouble with all of the crosslinking agents used for the systems mentioned here and which is not associated with disadvantages of some kind.

Surprisingly, substances have now been found which can be employed in all of the abovementioned crosslinking systems, do not interfere in the crosslinking mechanism, even when the paste which has not been crosslinked is stored for a prolonged period, do not influence the color, adhesion and mechanical properties of the crosslinked product and have a very good fungicidal action and which, in combination with crosslinking agents or with the organopolysiloxanes, are mixed into the paste.

Accordingly, the invention relates to plastic organopolysiloxane moulding compositions which have a microbicidal, and especially a fungicidal, action and are storable with the exclusion of water and which under the action of water or atmospheric air are already converted at room temperature into rubbery-elastic moldings or coatings, prepared by mixing α,ω-dihydroxypolydiorganosiloxanes with silicon compounds which serve as crosslinking agents and, optionally with α,ω-bis-(trimethylsiloxy)-polydimethylsiloxanes, with fillers and with heavy metal salts or amines which are known to accelerate the crosslinking, which are characterized in that they contain a benzimidazolyl-alkyl-carbamate of the general formula

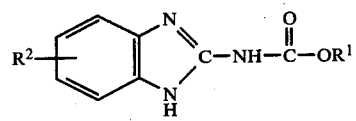

wherein
R¹ denotes an alkyl radical with 1 to 4 carbon atoms, which is optionally substituted by the radical —OR³, where
R³ represents an alkyl radical with 1 to 4 carbon atoms or the phenyl radical, and
R² denotes hydrogen, an alkyl radical with 1 to 4 carbon atoms, halogen or the nitro group,
and also, optionally, further substances having a fungicidal action.

The preparation of the benzimidazolyl-alkyl-carbamates is already known (compare, for example, U.S. Pat. No. 3,010,968).

The following compounds may be mentioned as examples of benzimidazolyl-alkyl-carbamates: benzimidazolyl-methyl-carbamate, 4-methyl-benzimidazolyl-methyl-carbamate, 5-methyl-benzimidazolyl-methyl-carbamate, benzimidazolyl-ethyl-carbamate, 4-methyl-benzimidazolyl-ethyl-carbamate, benzimidazolyl-isopropyl-carbamate, 4-ethyl-benzimidazolyl-isopropyl-carbamate, 5-methyl-benzimidazolyl-isopropyl-carbamate, 4-propyl-benzimidazolyl-isopropyl-carbamate, 4-butyl-benzimidazolyl-isopropyl-carbamate, 4-isobutyl-benzimidazolyl-isopropyl-carbamate, benzimidazolyl-ethylmethoxy-carbamate, 4-methyl-benzimidazolyl-methoxyethyl-carbamate, 5-methyl-benzimidazolylmethoxyethyl-carbamate, benzimidazolyl-ethoxyethyl-carbamate, benzimidazolyl-propoxyethyl-carbamate, benzimidazolyl-phenoxyethyl-carbamate, 4-methyl-benzimidazolyl-phenoxyethyl-carbamate and 5-methyl-benzimidazolyl-phenoxyethyl-carbamate.

The preferred benzimidazolyl-alkyl-carbamate is benzimidazolyl-methyl-carbamate.

It is also possible to employ mixtures of different benzimidazolyl-alkyl-carbamates.

In addition to the benzimidazolyl-alkyl-carbamates, yet further substances having a fungicidal action can be incorporated. In some cases synergistic effects can then arise. Examples of such further additives can be: halogenomethylthiophthalimides, such as, for example, N-(fluorodichloromethyl-thio)-phthalimides, N-dimethyl-N'-phenyl-(N'-fluorodichloromethyl-thio)-sulphamide, tetramethylthiurami-disulphide, tetraethylthiuram disulphide or 1-methylol-2-thiono-1,2-dihydrobenzthiazole.

These additives are employed in amounts such that there are about 1 to 25 parts by weight of the additive per 1 part by weight of benzimidazolyl-alkyl-carbamate.

The fungicidal substance added is a total of about 0.01–2% by weight, based on the total mixture. About 0.1–0.5% by weight is preferred. The agents having a fungicidal action can optionally also be added to the organopolysiloxanes as a solution in solvents, for example in dioxane. In general, the agent having a fungicidal action can also be incorporated as a solid with a very small particle size (100–350 microns). However, it is also possible to incorporate the fungicide in the form of a paste, for example in a silicone oil (for example polydimethylsiloxane oil).

The active compounds employed according to the invention are active, for example, against the following fungi: Penicillium species, such as *Penicillium glaucum, Penicillium funiculosum, Penicillium citrinum* and *Penicillium camerunense,* Mucor species, such as *Mucor racemosus,* Rhicopus species, such as *Rhicopus nigricans,* Pullularia species, such as *Pullularia pullulans,* Chaetomium species, such as *Chaetomium globosum,* Geotrichum species, such as *Geotrichum candidum,* Trichoderma species, such as *Trichoderma viride,* Aspergillus species, such as *Aspergillus flavus, Aspergillus terreus* and *Aspergillus niger,* and Coniophora species, such as *Coniophora cerebella.* In addition, these substances also act against yeasts, such as, for example, *Candida crusei* and *Candida albicans,* and against algae and other micro-organisms.

The present invention will now be explained in even more detail with the aid of the examples which follow:

EXAMPLE 1

A mixture of 60 g of α,ω-dihydroxypolydimethylsiloxane with a viscosity of 50,000 cP and 25 g of α,ω-bis-(trimethylsiloxy)-polydimethylsiloxane with a viscosity of 1,300 cP is initially introduced. 4 g of ethyltriacetoxysilane are added to this mixture at room temperature and the resulting mixture is stirred briefly. 1.5 g of titanium dioxide and 9.5 g of a finely dispersed silica and also 0.3 g of a mixture of 6 parts by weight of N-(fluorodichloromethylthio)-phthalimide and 1 part by weight of methylbenzimidazolyl-methylcarbamate are now added. The mixture is stirred in a planetary stirrer until it is homogeneous, which is the case after about 20 minutes. Finally, small amounts of a catalyst, in this case, for example, 5 mg of dibutyl-tin diacetate, are added and stirred in homogeneously for 10 minutes in vacuo. Evacuation is appropriate, in order to be able to fill the composition, after the mixing operation, homogeneously into a storage container (tube or cartridge).

In order to test the storage stability, the molding composition according to the invention was stored, after the paste had been filled into tubes with the exclusion of air, for 8 weeks at 50° C. and then spread out about 2 mm thick and completely cured by atmospheric humidity (65% relative atmospheric humidity) in about one day to give a rubber sheet. In contrast to the other fungicides, the sheet was snow white and shows no discoloration whatsoever, despite the paste having been stored at 50° C. (which corresponds to a storage stability, demanded in practice, of about ½ year at changing room temperatures).

A rubbery-elastic skin of this type has approximately the following mechanical properties, both before and after storage: modulus of elasticity 100%, about 0.4 MPa, tensile strength about 1.4 MPa, elongation at break about 600% and Shore A hardness about 22.

This rubber skin was not tested by the inhibition zone test according to Wallhauser (Deutscher Farberkalender 1970, pages 324–344, F. Eder Verlag, Frankfurt/M.) and excellent results were found. An inhibition zone of more than 5 mm had formed around the sample and even after the latter had been leached for 120 hours, this zone was still mold-resistant.

An outstanding fungus-repellent action, compared with compositions not provided with a fungistatic ingredient, was also observed in the so-called soil rotting test (garden compost soil adjusted to pH 7 with sand and lime, at 22° C. and approximately 90% relative atmospheric humidity with mold cultures and mold salt solutions).

EXAMPLE 2

A mixture of 45 parts by weight of α,ω-dihydroxypolydimethylsiloxane with a viscosity of 50,000 cP and 20 parts by weight of α,ω-bis-(trimethyl-siloxy)-polydimethylsiloxane with a viscosity of 1,300 cP is initially introduced. 5 parts by weight of di(ethyl acetoacetate)-diisobutyl-titanol are added at room temperature and mixing is carried out for about 5 minutes at room temperature. 5 parts by weight of a finely disperse silica, 20 parts by weight of chalk, 2 parts by weight of white pigment ($TiO_2$) and 0.1 part by weight of carbon black are added to this mixture and the mixture is then stirred in a planetary stirrer, in vacuo, until it is homogeneous. 1 part by weight of a fungicide paste (consisting of 60 parts by weight of α,ω-bis-(trimethylsiloxy)-polydemethylsiloxane, 1 part by weight of dioxane, 5 parts by weight of highly disperse silica and 30 parts by weight of a mixture consisting of 6 parts by weight of N-(fluorodichloromethylthio)-phthalimide and 1 part by weight of methylbenzimidazolyl-methyl-carbamate) and also 1 part by weight of dibutyl-tin dimaleate, as the catalyst, are now added, the mixture is stirred for about 10 minutes and 4 parts by weight of di-(N-methylbenzamido)-methylethoxysilane are now added to the total mixture and mixing is carried out in vacuo for 15 minutes. The further treatment is carried out as in Example 1.

The mechanical properties (both before and after storage) were: modulus of elasticity 100%, about 0.14 MPa, tensile strength about 0.7 MPa, elongation at break about 550% and Shore A hardness about 12.

A very good fungistatic action was determined with this system also.

In will be appreciated that the instant specification and examples are set forth by way of illustration and not limitation, and that various modifications and changes may be made without departing from the spirit and scope of the present invention.

What is claimed is:

1. An organopolysiloxane composition having a microbicidal action comprising an α,ω-dihydroxypolydiorganosiloxane, N-(fluorodichloromethylthio)-phthalimide and a benzimidazolyl-alkyl-carbamate of the formula

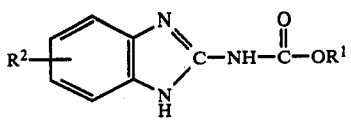

wherein

R$^1$ is an alkyl radical with 1 to 4 carbon atoms, optionally substituted by the radical —OR$^3$, R$^3$ is an alkyl radical with 1 to 4 carbon atoms or the phenyl radical, and R$^2$ is hydrogen, an alkyl radical with 1 to 4 carbon atoms, halogen or nitro.

2. A composition according to claim 1, further comprising a silicone-containing crosslinking agent for the siloxane.

3. A composition according to claim 2, further comprising a heavy metal salt or amine accelerant for crosslinking.

4. A composition according to claim 2, further comprising an α,ω-bis-(trimethylsiloxy)-polydimethylsiloxane.

5. A composition according to claim 2, further comprising an α,ω-bis-(trimethylsiloxy)-polydimethylsiloxane, wherein the carbamate is methylbenzimidazolyl-methyl-carbamate.

6. A composition according to claim 1, wherein the carbamate is present in about 0.01 to 2% by weight of the composition.

7. A composition according to claim 1, wherein the carbamate is present in about 0.1 to 0.5% by weight of the composition, the phthalamide is present in about 1 to 25 times the weight of the carbamate, the composition further comprising a silicon-containing crosslinking agent for the siloxane, a heavy metal salt or amine accelerant for crosslinking, and an α,ω-bis(trimethylsiloxy)-polydimethylsiloxane.

8. A rubbery elastic molding produced by conversion by water of the composition of claim 1.

9. A rubbery elastic molding produced by conversion by water of the composition of claim 2.

* * * * *